United States Patent [19]

Colon et al.

[11] Patent Number: 4,486,576

[45] Date of Patent: Dec. 4, 1984

[54] HIGH-TEMPERATURE, AROMATIC COATING MATERIALS FROM ARYL POLYHALIDES

[75] Inventors: Ismael Colon, Middlesex; Charles N. Merriam, Martinsville, both of N.J.

[73] Assignee: Union Carbide Corporation, Danbury, Conn.

[21] Appl. No.: 370,825

[22] Filed: Apr. 22, 1982

[51] Int. Cl.$^3$ ............................................. C08G 61/12
[52] U.S. Cl. .................................... 525/471; 525/507;
525/534; 528/125; 528/126; 528/128; 528/174;
528/175; 528/210; 528/211; 528/212; 528/214;
528/215; 528/216; 528/217; 528/218; 528/219;
528/397
[58] Field of Search ...................... 525/534, 471, 507;
528/125, 126, 128, 174, 175, 210–218, 219, 397

[56] References Cited

U.S. PATENT DOCUMENTS 4,093,600  6/1978  Fan et al. ............................ 525/534
4,263,466  4/1981  Colon et al. ........................ 585/421

FOREIGN PATENT DOCUMENTS 928576  6/1963  United Kingdom ................ 528/397

OTHER PUBLICATIONS

Gazzetta Chimica Italiana, vol. 91, pp. 223 and 228, (1961).

Primary Examiner—Wilbert J. Briggs, Sr.
Attorney, Agent, or Firm—Bernard Francis Crowe

[57] ABSTRACT

High-temperature coating materials are prepared by cross-linking copolymers of oligomers produced by nickel catalyzed coupling of unsubstituted aryl polyhalides with substituted organic halides.

25 Claims, No Drawings

HIGH-TEMPERATURE, AROMATIC COATING MATERIALS FROM ARYL POLYHALIDES

CROSS-REFERENCE TO RELATED APPLICATIONS

This application is related to commonly-assigned application Ser. No. 072,309 filed Sept. 11, 1979 and application Ser. No. 335,521 filed Dec. 29, 1981.

BACKGROUND OF THE INVENTION

This invention pertains to the preparation of high-temperature, aromatic coating materials from aryl polyhalides and more particularly to the use of nickel coupling for said preparation.

There is a continuing need for the production of high-temperature, high-performance materials, such as, coating, laminate, and composite impregnating materials. The use of aryl coupling by nickel catalysis has been demonstrated to be a viable way to produce high molecular weight aromatic thermoplastic materials. Due to the nature of aryl coupling via nickel catalysis, it is only suitable for the production of soluble, that is, amorphous polymers. Such polymers are generally unsuitable as coating materials due to their attack by various organic solvents.

It is therefore an object of this invention to provide a method of using aryl coupling via nickel catalysis to provide satisfactory coating materials.

It is another object of this invention to produce novel high-temperature, chemically-resistant coating materials.

Other objects will become apparent to those skilled in the art upon the further reading of the specification. These materials could also be applicable as laminate, composite, and molding materials.

SUMMARY OF THE INVENTION

A method of preparing high-temperature, cross-linked coating materials which are solvent resistant has been developed which comprises the steps in order of:

(A) contacting an unsubstituted aryl polyhalide monomer with a catalyst mixture in the presence of a reducing metal selected from the group consisting of zinc, magnesium and manganese or mixtures thereof, in a dipolar, aprotic solvent in which said monomer is soluble, under essentially anhydrous conditions for a period of time and at a temperature sufficient to couple said monomer, until a macromolecule having a degree of polymerization representative of an oligomer or a polymer is produced, wherein the catalyst mixture comprises an anhydrous nickel compound and at least one ligand selected from the group consisting of a triarylphosphine having from about 6 to about 14 carbon atoms in each aryl moiety and an aromatic bidentate compound containing at least one ring nitrogen atom and from about 5 to about 30 carbon atoms and wherein the ratio of gram atoms of nickel per mole of aryl polyhalide monomer is from about 0.001 to about 0.1, the amount of ligand is from about 1 to about 50 moles per gram atom of nickel and the amount of reducing metal is at least about 1 mole of reducing metal per mole of aryl polyhalide monomer;

(B) adding to the reaction mixture of (A) about 0.01 to about 1 moles of a substituted organic halide having at least one substituent per molecule selected from the group consisting of acetoxy, amide, ester, amine, vinyl, alkyne, cyano, silane, epoxide, and isocyanate per mole of unsubstituted aryl polyhalide whereby said macromolecules in (A) further couple with said substituted organic halide to form mixed macromolecules; and (C) cross-linking the mixed macromolecules from (B).

Generally speaking it is undesirable to combine steps (A) and (B), that is, mix the unsubstituted aryl polyhalide with the substituted organic halide at the beginning of the polymerization or coupling reaction. If these two steps are not kept separate as described above, the nickel catalyst interacts with most of the substituent groups on the substituted organic halide yielding catalytically inactive species. This severely limits the degree of polymerization which can be achieved.

It is possible to use an integrated technique wherein the aryl polyhalide monomers are synthesized and then coupled in the solution in which they were prepared without the need for isolation and purification. The main requirement for this variation is that the monomer solution be substantially dry and free of impurities, especially those that adversely interact with the nickel catalyst, before the solution of monomer is added to the catalyst mixture. It is also necessary that the solvent in such cases, that is, where the monomers are prepared and left in solution, be a dipolar aprotic solvent or at least a mixture of a dipolar aprotic solvent and an aromatic solvent, such as, benzene, toluene, xylene, and the like.

The term "aprotic" is used herein to mean a solvent which does not contain active hydrogens or is a proton source to any appreciable degree. The preferred aprotic dipolar solvents include N,N-dimethylformamide, dimethylsulfoxide, sulfolane, and the like. If desired these dipolar solvents can be mixed with lower polarity inert solvents, such as, saturated aliphatic hydrocarbons, including pentanes, hexanes, dodecanes, and the like; aromatic hydrocarbons, such as, benzene, toluene, xylenes, and the like; saturated aliphatic and cycloaliphatic ethers, such as, diethyl ether, diglyme, tetrahydrofuran, and the like. N,N-dimethylacetamide is the most preferred aprotic dipolar solvent and toluene is the most preferred lower polarity inert solvent for use in this invention.

The term "unsubstituted" is used herein to mean "not possessing a reactive substituent group which would allow or lead to cross-linking by any conventional cross-linking method of the compound containing said group." It follows then that the term "substituted" is used herein to connote possessing the groups described supra.

It is essential in the polymerization reaction that the solvent be maintained substantially anhydrous before and during the reaction. While amounts of water of up to about 0.01 percent by weight can be tolerated, amounts of water greater than this are to be avoided as the reaction of water with the aryl dihalide monomers in the presence of a nickel catalyst leads to reduction and only low molecular weight products are obtained. The reaction of water with the catalyst mixture also leads to be deactivation of the active catalyst.

Any unsubstituted dihalobenzenoid compound of mixture of dihalobenzenoid compounds can be employed in this invention. The halogen groups may be fluorine, chlorine, bromine or iodine in a broad sense but for the purposes of this invention chlorine is by far the preferred halogen because of fewer side reactions in the polymerization reaction.

The unsubstituted aryl dichloride monomers may have various structural combinations including but not limited to the following:

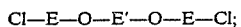

and

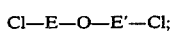

wherein E is the residuum of a phenolic compound and E' is the residuum of a dihalobenzenoid compound. E then is the residue of a phenolic compound after the removal of the aromatic hydroxyl group or groups. Correspondingly E' is a compound which results from the removal of one or both halogens from a dichlorobenzenoid compound.

A mixture comprising at least two aryl polyhalide monomers can also be used selected from the group consisting of:

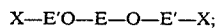

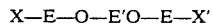

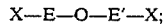

and

In a simpler sense suitable unsubstituted aryl dichloride monomers have a formula:

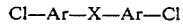

wherein X represents a divalent radical which allows the resulting polymer to be soluble in the dipolar aprotic solvent. A typical example would be an aryl ether sulfone such as:

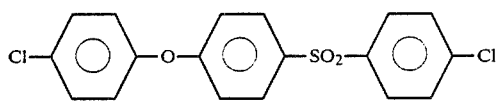

wherein X is represented by

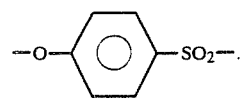

Preferred "unsubstituted" aryl dichlorides include the following:

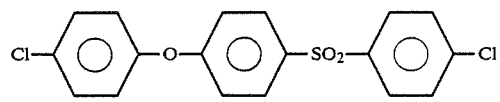

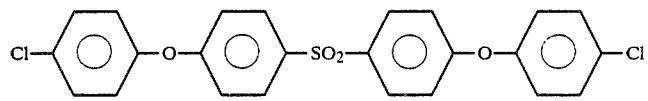

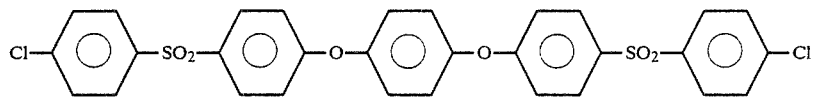

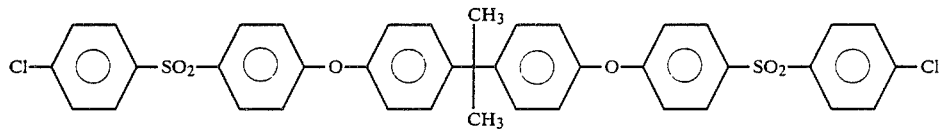

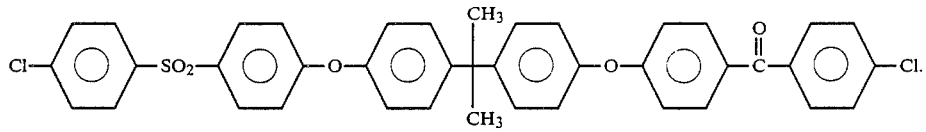

The substituted organic halides used in the invention are also preferably chlorides; and while they may contain many substituents, they may not contain nitro or protic groups, such as carboxylic acid or phenolic hydroxyl. These two groups tend to react with the catalyst and inhibit the polymerization reaction.

Representative substituted aryl dichlorides which can be used in this reaction include:

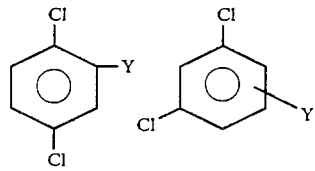

where

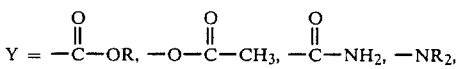

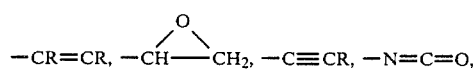

and Si(OR)₃.

When the substituted organic halide is not an aryl or vinyl halide, then it should not contain β-hydrogens, which would promote β-elimination, because this would severely limit the amount of functionality incorporated into the material. An example of a useful non-aromatic organic halide is propargyl chloride (Cl—CH₂—C≡CH).

The unsubstituted aryl polyhalide monomer can be produced by the reaction of a dihalobenzenoid compound with a phenolic compound and at least one alkali metal carbonate in a liquid phase of an aprotic solvent and an azeotrope former, such as, hexane, heptane, octane, benzene, toluene, xylene, and the like, for a time and at a temperature sufficient to form an unsubstituted aryl dichloride monomer. The dihalobenzenoid compound has an inert electron withdrawing group in one or more of the positions ortho and para to the halogen atoms thereby activating the halogen atoms to a level sufficient to react with the alkali metal salt of the phenolic compound. Water is then removed from the reaction mass, with an azeotrope former until the resultant solution is substantially anhydrous. The azeotrope former itself is then distilled off leaving the solution of unsubstituted aryl dihalide.

Particularly preferred dihalobenzenoid compounds include 4,4'-dichlorodiphenylsulfone and 4,4'-dichlorobenzophenone and mixtures thereof.

Preferred phenolic compounds include bisphenol A (2,2-bis[p-hydroxyphenyl]propane), hydroquinone, bisphenol S (bis[p-hydroxyphenyl]sulfone), p-chlorophenol, and the like.

Suitable nickel compounds are nickel (0) complexes and those reducible by organometallic and metal reducing agents. These compounds include nickel halides, that is, chlorides, bromides and iodides, nickel sulfates, nickel phosphates, nickel carbonates, nickel salts of organic acids having 1 to 18 carbons, such as, nickel formate, nickel acetate, and nickel organic complexes such as nickel acetylacetonate, dichloro-bis(triphenylphosphine), nickel(II), and the like; and nickel(0) compounds, such as, bis(1,5-cyclooctadiene)nickel, tetrakis(triphenylphosphine)nickel, and the like. The anion of the nickel compound is unimportant and merely serves to provide nickel ion to the catalyst mixture, but it must not interfere with the reaction of the nickel compound with the ligand. The preferred anions are the halides.

Suitable triarylphosphines include triphenylphosphine, triphenylphosphines containing alkyl or alkoxy substituents having up to about 8 carbon atoms, and unsubstituted or alkyl- and alkoxy-substituted trinaphthyl phosphines.

Suitable bidentate compounds include 2,2'-bipyridine, 1,10-phenanthroline, 1,8-naphthylpyridine, 2-methylaminopyridine, and the like.

The most preferred catalyst comprises nickel chloride, triphenylphosphine and sodium bromide.

The preferred ratio of gram atoms of nickel per mole of aryl dihalide monomer is about 0.001 to about 0.1, with the most preferred range being about 0.005 to about 0.05. The ratio of triarylphosphine to nickel can range from 0 to about 100, preferably from about 10 to about 50 moles per gram atom of nickel. The ratio of bidentate ligand to nickel can range from 0 to about 5, and preferably from about 0.2 to about 2 moles of bidentate ligand per gram atom of nickel.

The preferred reducing metal for use in the polymerization of both the unsubstituted and substituted aryl dihalides is zinc metal although magnesium and manganese metals can also be used. It is preferred that the metal be in finely divided form with an average sieve size of 20 or finer when measured on the U.S. sieve scale. Although the stoichiometric amount of reducing metal required in these polymerization or coupling reactions is about 1 mole of reducing metal per mole of aryl dihalide monomer, it is preferred to use a 50 percent excess or greater.

The polymerization or coupling reactions represented in steps (A) and (B) referred to above can take place at temperatures of from about 0° C. to about 250° C., preferably from about 25° C. to about 120° C., and most preferably from about 40° C. to about 100° C. Pressure is not narrowly critical and so superatmospheric as well as subatmospheric pressures can be used as well as atmospheric pressure. For economic reasons atmospheric pressure is preferred. The reaction is preferably carried out in an inert atmosphere, such as, under nitrogen, argon, helium, or the like.

The time of reaction is not narrowly critical and will depend on the nature of the reactants. Practical limits can be easily determined in each case by one skilled in the art since the progress of polymerization or cross-linking can be followed by many known methods including direct observation.

Inorganic salt promoters may be used if desired with the triarylphosphines as ligands in order to reduce reaction times and/or temperatures.

Preferred inorganic salt promoters include alkali, alkaline earth, zinc, magnesium, manganese, and aluminum halides or mixtures thereof. Iodides, chlorides and bromides are particularly preferred. The amount of promoter when used can range from about 0.1 to about 1000 moles per gram atom of nickel with about 1 to about 100 moles of promoter being preferred. If desired one can also employ alkali, alkaline earth, zinc, magnesium, manganese, and aluminum sulfates or phosphates or mixtures thereof as promoters.

Suitable cross-linking agents (when required) for use in Step (C) of this invention include the following:
Epoxy resins including aliphatic, cycloaliphatic and aromatic epoxy resins;
Melamine resins;
Urethanes;
Amide resins;
Phenolic resins; and
Silicates.

The choice of cross-linking agent for use in this invention is not narrowly critical and includes those which can react through functional groups such as hydroxyl, amide, ester, amine, vinyl, epoxide, isocyanate and like groups. These are commercially available and are also described in various scientific and technical publications. Thus, for example, epoxy resins are described together with their preparation and use in Epoxy Resins by Lee, H. and Neville, K, McGraw-Hill Book Company, Inc., New York City (1957). Other cross-linking agents include peroxides, alkoxy silanes and silicates. With certain functional groups, such as alkynes, there is no need to add a cross-linking agent, since these materials self-cure at elevated temperatures.

The invention is further described in the examples which follow. All parts and percentages are by weight unless otherwise specified.

EXAMPLES 1-12

In each of the examples listed in the Table, the monomer reaction was run in a three-neck flask equipped with a thermometer, a mechanical stirrer, and a Claisen adapter to which was attached a nitrogen purge line and a Dean-Stark trap with a condenser. Fifty-four grams (0.188 m) of 4,4'-dichlorodiphenylsulfone, 24.3 g (0.189 m) of p-chlorophenol, and 34 g (0.246 m) of potassium carbonate were reacted in 165 ml of N,N-dimethylacetamide (DMAC) and 105 ml of toluene. In each case, the reaction was run with a nitrogen purge and was heated by an electric mantle. Toluene and the water of reaction were condensed and collected in the Dean-Stark trap. As the toluene was removed, the temperature of the mixture increased. The temperature was held at 155° for the time specified in the Table by allowing the toluene to recycle. After this time period, two 20 ml portions of toluene were added to the reaction mixture and allowed to distill off (maximum temperature 162°-164°) to remove any residual water.

The monomer solution was allowed to cool to ca. 120° and was then filtered under nitrogen into a mixture of 36.0 g (0.55 m) of zinc dust, 24.0 g (0.0916 m) triphenylphosphine, and 0.24 g (0.0018 m) of nickel chloride in 75 ml of dry DMAC. In examples 1-7 bipyridine (0.30 g) was used as a promoter, and in examples 8-12 sodium bromide (3.0 g) was used. The monomer was oligomerized under a nitrogen atmosphere with magnetic stirring at 70° for the length of time specified in the Table. The resulting oligomer was functionalized by adding the specified amount of 3,5-dichlorophenyl acetate to the oligomer solution and allowing the mixture to react for the length of time indicated. More nickel chloride was added along with the dichlorophenyl acetate, as indicated in the Table, to make up for loss of nickel due to side reactions with the dichlorophenyl acetate. After the specified reaction period, the reaction flask was exposed to the atmosphere, and the oligomer solution was diluted with 100 ml of DMAC. The diluted solution was filtered through a medium glass filter funnel and coagulated in 2 L of methanol in a blender. The oligomer was hydrolyzed in 2 L of hot 2M HCl solution for two hours with stirring. This procedure was sufficient to hydrolyze the acetate groups and yield free phenolic hydroxyl groups on the oligomer. The slurry was filtered and washed thoroughly with deionized water followed by several cake volumes of methanol. The functionalized oligomer was then dried in a vacuum oven (80° and <1 mm Hg) overnight to yield approximately 50 g of dry material. The reduced viscosity (RV) of the oligomer was measured in N-methyl pyrrolidinone at 25° at a concentration of 0.2 g/100 ml of solution.

As the data in the Table indicates, the procedure can be used to produce materials ranging from low molecular weight oligomers to high polymers (RV's>0.5) with an average degree of functionality in a very broad range.

TABLE

| EXAMPLE | MONOMER REACTION TIME | OLIGOMER REACTION TIME | DCPA[a] | ADDITIONAL NiCl$_2$ | COOLIGOMERIZATION REACTION TIME | RV | AVERAGE FUNCTIONALITY |
|---|---|---|---|---|---|---|---|
| 1 | 3.3 HRS. | 6 HRS. | 3.0 g | 0.78 g | 20 HRS. | 0.20 | 1.3 |
| 2 | 2.5 | 21 | 3.0 | 0.39 | 23 | 0.42 | 4.2 |
| 3 | 4.6 | 6 | 3.0 | 0.39 | 17 | 0.37 | 3.5 |
| 4 | 4.1 | 21 | 3.0 | 0.39 | 2.5 | 0.61 | 7.9 |
| 5 | 4.4 | 22 | 3.0 | 0.39 | 22 | 0.56 | 6.9 |
| 6 | 3.3 | 8 | 3.0 | 0.30 | 13 | 0.25 | 1.8 |
| 7 | 2.8 | 21 | 3.0 | 0.39 | 48 | 0.59 | 7.5 |
| 8 | 3.4 | 21 | 3.0 | 0.78 | 3.6 | 0.29 | 2.3 |
| 9 | 3.2 | 24 | 3.0 | 0.39 | 20 | 0.38 | 3.6 |
| 10 | 3.0 | 19 | 6.0 | 0.39 | 71 | 0.42 | 8.4 |
| 11 | 3.1 | 21 | 6.0 | 0.39 | 72 | 0.67 | 18 |
| 12 | 3.2 | 21 | 6.0 | 0.39 | 24 | 0.47 | 10 |

[a]Dichlorophenyl acetate

To illustrate that high-temperature, high-performance coatings could be produced from the previously described oligomers, the following examples are presented.

EXAMPLE 13

Three grams of polymer produced in example 11 was dissolved in 15 g of hot DMAC (N,N-dimethylacetamide) in a beaker. To this mixture was added 1.0 g of an epoxy cresol novolac cross-linking agent, with an epoxy equivalent weight of 235. This solution was used to make 5 mil draw down coatings on cold rolled steel panels. The solvent was allowed to evaporate at room temperature to produce clear films, which were then cured at 260° for 4 hours. The resulting brown coatings were highly solvent resistant (passed 30 min. exposure to DMAC) indicating that considerable cross-linking had occurred. The coatings were tough (impact resistance, direct: 110 in-lbs., reverse: 50 in-lbs.) flexible (the steel panels could be bent greater than 120° without film failure), and had a glass transition temperature of 275° C.

EXAMPLE 14

Three grams of polymer produced in example 12 was dissolved in 12 ml of hot DMAC along with 1.6 g the epoxy cresol novolac cross-linking agent used in example 13. Five mil draw down coatings on cold rolled steel were prepared from this solution and cured at 260° for 6 hours. Once again, the coatings produced after cure were highly solvent and chemically resistant. Dynamic mechanical analysis of the coating mixture indicated that while the polymer produced in example 12 had a glass transition of about 250°, the uncured mixture had a much lower Tg (~140°), but the Tg of the coating mixture increased on cure to 275° after 6 hours at 260° indicating that the oligomer was cross-linked by the epoxy.

To illustrate that a self-curing material can be produced, the following example is presented.

EXAMPLE 15

A monomer solution as described for examples 1–12 was prepared and added to a mixture of 36.0 g zinc, 24.0 g triphenylphosphine, 0.24 g nickel chloride, and 1.0 g NaBr in 40 ml of dry DMAC. This mixture was reacted under a nitrogen atmosphere at 70° C. for 20 hours. The resulting material was functionalized by adding 3 ml of propargyl chloride along with 0.1 g NiCl$_2$ to the solution and reacting for an additional 3 hours. The resulting mixture was diluted with 150 ml of DMAC and filtered. The filtrate was coagulated in methanol (filtrate-to-methanol ratio of 1:5) and the solid was collected by filtration. After washing with deionized water and drying the material was found to have a RV=0.54.

Three grams of this material was dissolved in 15 g of hot DMAC and coated onto cold rolled steel panels. The solvent was evaporated off at 150° C. for several hours and then the panels were cured at 250°–300° C. for 30 minutes. The resulting coatings had a Tg>280° C., were solvent and chemically resistant, tough (impact resistance>160 in-lbs.), and flexible.

Although the invention has been described in its preferred forms with a certain degree of particularity, it will be understood by those who are skilled in the art that the present disclosure has only been made by way of example, and that numerous changes can be made without departing from the spirit and the scope of the invention.

We claim:

1. Method of preparing high temperature, cross-linked, solvent-resistant coating materials which comprise the steps in order of:
    (A) contacting one or more unsubstituted aryl polyhalide monomers wherein the unsubstituted aryl polyhalide monomer is produced: (1) by the reaction of a dihalobenzenoid compound with a phenolic compound and at least one alkali metal carbonate in a liquid phase of an aprotic solvent and an azeotrope former for a time and at a temperature sufficient to form the "unsubstituted" aryl dichloride monomer, wherein the dihalobenzenoid compound has an inert electron withdrawing group in one or more of the positions ortho and para to the halogen atoms thereby activating the halogen atoms to a level sufficient to react with the alkali metal carbonate reaction product of the phenolic compound; and (2) removing water from the reaction mass of 1 as an azeotrope with said azeotrope former until substantially anhydrous conditions are attained and excess azeotrope former is substantially removed; with a catalyst mixture in the presence of a reducing metal selected from the group consisting of zinc, magnesium and manganese or mixtures thereof in a dipolar aprotic solvent in which said monomer is soluble, under essentially anhydrous conditions for a period of time and at a temperature sufficient to couple said monomer until macromolecules having a degree of polymerization representative of an oligomer or a polymer are produced, wherein the catalyst mixture comprises an anhydrous nickel compound and at least one liquid selected from the group consisting of a triarylphosphine having from about 6 to about 14 carbon atoms in each aryl moiety and an aromatic bidentate compound containing at least one ring nitrogen atom and from about 5 to about 30 carbon atoms and wherein the ratio of gram atoms of nickel per mole of aryl polyhalide monomer is from about 0.001 to about 0.1, the amount of ligand is from about 1 to about 50 moles per gram atom of nickel and the amount of reducing metal is at least about 1 mole of reducing metal per mole of aryl polyhalide monomer;
    (B) adding to the reaction mixture of (A) about 0.01 to about 1.0 moles of a substituted organic halide having at least one substitutent per molecule selected from the class consisting of acetoxy, amide, ester, amine, vinyl, alkyne, cyano, silane, epoxide, and isocyanate groups, per mole of unsubstituted aryl polyhalide whereby said macromolecule in (A) further couples with said substituted organic halide to form mixed macromolecules; and
    (C) cross-linking the mixed macromolecules from (B).

2. Method claimed in claim 1 wherein the dihalobenzenoid compound is a mixture of 4,4'-dichlorodiphenylsulfone and 4,4'-dichlorobenzophenone.

3. Method claimed in claim 1 wherein the dihalobenzenoid compound is 4,4'-dichlorodiphenylsulfone.

4. Method claimed in claim 1 wherein the phenolic compound is selected from the group consisting of bisphenol A, hydroquinone, bisphenol S and p-chlorophenol.

5. Method claimed in claim 1 wherein the phenolic compound is p-chlorophenol.

6. Method claimed in claim 1 wherein the aprotic solvent is selected from the group consisting of N,N-dimethylacetamide, N,N-dimethylformamide, dimethylsulfoxide and sulfolane, the azeotrope former is selected from the group consisting of toluene, benzene, heptane and xylene, and the alkali metal carbonate is selected from the group consisting of sodium carbonate and potassium carbonate and mixtures thereof.

7. Method claimed in claim 1 wherein the aryl polyhalide monomer is selected from the group consisting of:

X—E'—O—E—O—E'—X;

X—E—O—E'—O—E—X; and

X—E—O—E'—X;

wherein X is chlorine, E is the residuum of a phenol compound and E' is the residuum of a dihalobenzenoid compound.

8. Method claimed in claim 7 wherein the aryl polyhalide monomer has the formula:

Cl—⟨○⟩—O—⟨○⟩—SO$_2$—⟨○⟩—O—⟨○⟩—Cl

9. Method claimed in claim 7 wherein the aryl polyhalide monomer has the formula:

Cl—⟨○⟩—O—⟨○⟩—SO$_2$—⟨○⟩—Cl

10. Method claimed in claim 1 wherein the aryl polyhalide is a mixture comprising at least two aryl polyhalide monomers selected from the group consisting of:

X—E'—O—E—O—E'—X;

X—E—O—E'—O—E—X;

X—E—O—E'—X; and

X—E'—X where X, E, and E' are as defined above.

11. Method claimed in claim 10 wherein the aryl polyhalide is a mixture comprising at least two of the following:

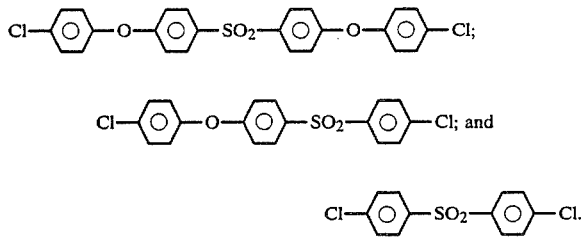

12. Method claimed in claim 1 wherein the substituted organic halide has the following structure:

where Z=C≡CH, CR=CR$_2$, or Si(OR)$_3$.

13. Method claimed in claim 12 wherein the substituted organic halide is propargyl chloride.

14. Method claimed in claim 1 wherein the catalyst mixture comprises an anhydrous nickel compound selected from the group consisting of nickel chloride, bromide and iodide, triphenylphosphine, and optionally a promoter selected from the metal halides sodium bromide or sodium iodide, or an aromatic bidentate compound selected from 2,2'-bipyridine or 1,10-phenanthroline.

15. Method claimed in claim 1 wherein the catalyst mixture comprises nickel chloride, triphenylphosphine, and sodium bromide.

16. Method claimed in claim 1 wherein the catalyst mixture comprises nickel chloride, triphenylphosphine, and sodium iodide.

17. Method claimed in claim 1 wherein the catalyst mixture comprises nickel chloride, triphenylphosphine, and 2,2'-bipyridine.

18. Method claimed in claim 1 wherein the reducing metal is selected from the group consisting of zinc, magnesium, and manganese.

19. Method claimed in claim 1 wherein the reducing metal is zinc.

20. Method claimed in claim 1 wherein steps (A) and (B) are carried out at a temperature of from 0° to about 250° C.

21. Method claimed in claim 1 wherein the cross-linking agent in step (C) is selected from the group consisting of a multifunctional epoxide, anhydride, isocyanate, amide, acid chloride, phenol, alcohol, amine and ester, or a peroxide, alkoxy silane, or silicate.

22. Method claimed in claim 1 wherein the cross-linking agent in step (C) is an epoxy cresol novolac.

23. Method claimed in claim 1 wherein the monomer is produced from a 1:1 mole ratio of 4,4'-dichlorodiphenylsulfone and p-chlorophenol, the aprotic solvent is N,N-dimethylacetamide, the azeotrope former is toluene, the reducing metal is zinc, and the catalyst comprises nickel chloride, triphenylphosphine and sodium bromide.

24. Method claimed in claim 23 wherein the substituted organic halide in (B) is dichlorophenylacetate and the cross-linking agent in (C) is an epoxy cresol novolac.

25. Method claimed in claim 23 wherein the substituted organic halide in (B) is propargyl chloride, and cross-linking is effected by heating to 250° to 300° C.

* * * * *